United States Patent
Brodam

(10) Patent No.: US 8,806,816 B2
(45) Date of Patent: Aug. 19, 2014

(54) SOLAR MODULE FRAMES HAVING WATER DRAIN

(71) Applicant: Sapa Extrusions, Inc., Rosemont, IL (US)

(72) Inventor: Michael Brodam, Sankt Augustin (DE)

(73) Assignee: Sapa Extrusions, Inc., Rosemont, IL (US)

(*) Notice: Subject to any disclaimer, the term of this patent is extended or adjusted under 35 U.S.C. 154(b) by 0 days.

(21) Appl. No.: 14/181,154

(22) Filed: Feb. 14, 2014

(65) Prior Publication Data

US 2014/0158648 A1 Jun. 12, 2014

Related U.S. Application Data

(63) Continuation of application No. 13/062,087, filed as application No. PCT/EP2009/006354 on Sep. 2, 2009, now Pat. No. 8,650,815.

(30) Foreign Application Priority Data

Sep. 3, 2008 (DE) .......................... 10 2008 045 540

(51) Int. Cl.
  *E04F 15/00* (2006.01)
  *F24J 2/46* (2006.01)

(52) U.S. Cl.
  CPC .......... *F24J 2/4614* (2013.01); *H01J 31/0424* (2013.01)
  USPC ......................................................... 52/177

(58) Field of Classification Search
  CPC ............... Y02E 10/47; H01C 31/0422; H01C 31/0424; H01C 31/0482; F24J 2/52; F24J 2/5211; F24J 2/4614
  USPC ....................... 52/656.1, 656.2, 656.5, 173.3; 248/346.01, 346.4
  See application file for complete search history.

(56) References Cited

U.S. PATENT DOCUMENTS

| | | | | |
|---|---|---|---|---|
| 2,989,788 A * | 6/1961 | Kessler | ......................... | 403/295 |
| 3,826,053 A * | 7/1974 | Cameron | ..................... | 52/309.1 |
| 4,372,292 A * | 2/1983 | Ort | ................. | 126/622 |
| 4,838,951 A * | 6/1989 | Riermeier et al. | ............ | 136/251 |
| 5,378,077 A * | 1/1995 | Paulsen | ......................... | 403/402 |
| 5,502,906 A * | 4/1996 | Yamawaki | ...................... | 38/102 |
| 6,332,657 B1 * | 12/2001 | Fischer | ......................... | 312/111 |
| 6,799,398 B1 * | 10/2004 | Plevyak | ....................... | 52/173.3 |
| 6,973,953 B2 * | 12/2005 | Winner | ......................... | 160/381 |
| 7,484,819 B2 * | 2/2009 | Frederick et al. | .......... | 312/257.1 |

(Continued)

FOREIGN PATENT DOCUMENTS

| | | | | |
|---|---|---|---|---|
| DE | 3611542 A1 * | 10/1987 | ............. | H01L 31/04 |
| DE | 102006061284 A1 * | 6/2008 | ............. | H01L 31/05 |
| WO | WO 9508041 A1 * | 3/1995 | ............. | E06B 3/964 |

*Primary Examiner* — Mark Wendell
*Assistant Examiner* — Keith Minter
(74) *Attorney, Agent, or Firm* — Loeb & Loeb LLP

(57) ABSTRACT

The invention relates to a frame (R) for a solar Module, wherein the frame (R) comprises a plurality of aluminum extruded profiles (SP), which form the sides of the frame (R) and which are connected to each other at the corners thereof; wherein at least one aluminum extruded profile (SP) comprises at least one hollow chamber (H), wherein the frame (R) comprises corner elements (E, E'), wherein at least one corner element (E, E') comprises a discharge opening (18, AB), and the discharge opening (18, AB) is connected to a hollow chamber (H) of at least one adjacent aluminum extruded profile (SP).

16 Claims, 6 Drawing Sheets

(56) References Cited

U.S. PATENT DOCUMENTS

| | | | |
|---|---|---|---|
| 7,571,574 B2* | 8/2009 | Yu | 52/213 |
| 7,797,889 B2* | 9/2010 | McClintock et al. | 52/173.3 |
| 7,900,407 B2* | 3/2011 | Plaisted | 52/173.3 |
| 8,109,049 B2* | 2/2012 | Suganuma et al. | 52/173.3 |
| 8,256,170 B2* | 9/2012 | Plaisted et al. | 52/173.3 |
| 8,344,239 B2* | 1/2013 | Plaisted | 136/251 |
| 8,607,511 B2* | 12/2013 | Hirayama | 52/173.3 |
| 2001/0034989 A1* | 11/2001 | Geiberger et al. | 52/287.1 |
| 2004/0187909 A1* | 9/2004 | Sato et al. | 136/251 |
| 2005/0257453 A1* | 11/2005 | Cinnamon | 52/173.3 |
| 2007/0234677 A1* | 10/2007 | Sironko et al. | 52/656.1 |
| 2008/0053517 A1* | 3/2008 | Plaisted et al. | 136/251 |
| 2010/0162641 A1* | 7/2010 | Reyal et al. | 52/173.3 |
| 2010/0218810 A1* | 9/2010 | Suganuma et al. | 136/251 |
| 2011/0108093 A1* | 5/2011 | Hessler et al. | 136/251 |
| 2011/0180680 A1* | 7/2011 | Brodam | 248/346.01 |
| 2011/0194886 A1* | 8/2011 | Wu et al. | 403/23 |
| 2011/0209745 A1* | 9/2011 | Korman et al. | 136/251 |
| 2012/0234379 A1* | 9/2012 | Takenaka | 136/251 |

\* cited by examiner

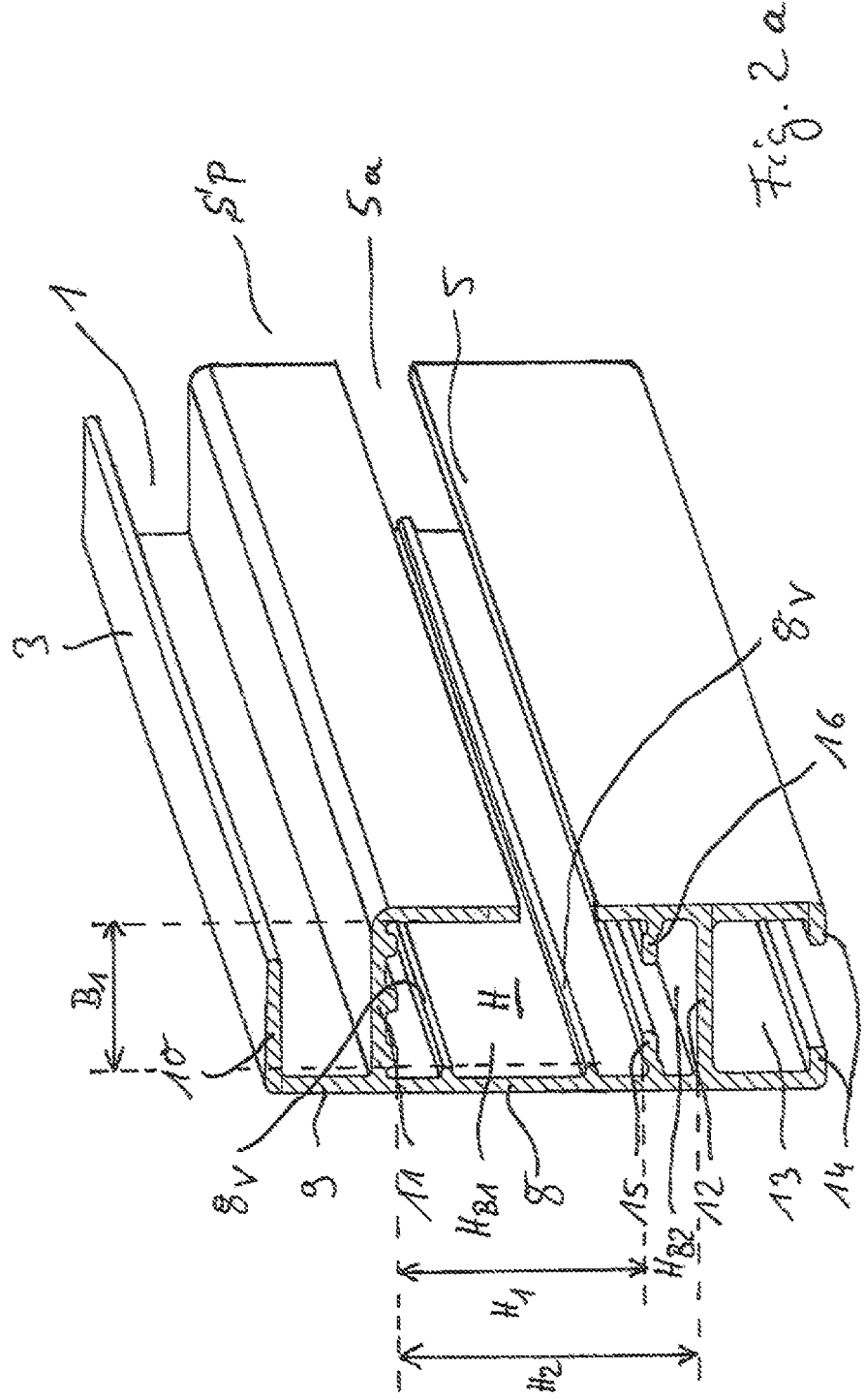

SOLAR MODULE FRAMES HAVING WATER DRAIN

CROSS-REFERENCE TO RELATED APPLICATION

This application is a continuation of U.S. patent application Ser. No. 13/062,087, filed on Mar. 29, 2011, entitled "SOLAR MODULE FRAMES HAVING WATER DRAIN," which is 371 of International Application No. PCT/EP09/06354, filed on Sep. 2, 2009, entitled "SOLAR MODULE FRAMES HAVING WATER DRAIN," which is the international application of German Patent Application No. 10 2008 045 540.5, filed on Sep. 3, 2008, the entire contents of which are incorporated herein by reference in their entireties.

BACKGROUND

The present invention relates to a frame for a solar module, wherein the frame comprises a plurality of aluminum extruded profiles, which form the sides of the frame and which are connected to one another at the corners thereof, wherein at least one aluminum extruded profile comprises at least one hollow chamber.

Frames for solar modules are often produced from aluminum extruded profiles. The extruded profiles are in the process sawn to length and mitered and connected to one another by means of insert-able corner connectors. When frost occurs, any rainwater or condensation water which may have penetrated can damage or destroy the frame. To prevent this, it is essential to make sure that the water can flow out of the frame. Holes are drilled or punched into the hollow chambers of the frame for this purpose. The miter-cut profiles are connected to one another by means of corner connectors.

The disadvantage with the above described frames is the extra effort required to produce the discharge holes and the holes for the electrical equipotential bonding.

SUMMARY

The object of the present invention is to further develop a frame, which is produced from aluminum extruded profiles, to the effect that no discharge drill holes have to be incorporated into the extruded profiles of the frame.

This object is achieved according to the invention by the frame comprising corner elements, wherein at least one corner element comprises a discharge opening and the discharge opening is connected to a hollow Chamber of at least one adjacent aluminum extruded profile.

It is particularly advantageous if the aluminum extruded profiles are electrically connected to electrically conductive connectors which can be inserted into the open face sides of the aluminum extruded profiles. Electrical equipotential bonding is hereby ensured between all frame parts.

The connectors at the same time can be or are advantageously pressed in a force-fit manner into the open face sides of the aluminum extruded profiles. A secure and stable connection is hereby produced between the extruded profiles. The connectors advantageously comprise ribs which, after they have been inserted into the face sides, press with their ends against the inner wall of the aluminum extruded profiles, so that the connectors cannot inadvertently slip out of the face sides of the extruded profiles. The ribs are in the process only integrally formed with one side onto the base body of the connectors and can easily spring away towards one side when inserted. In addition, the connector is advantageously formed as an extruded profile which is cut to length. The base body of the connector is formed by two plates which are integrally formed together at right angles to one another, from the flat sides of which the ribs in each case protrude outwards and/or inwards at an angle. The angle can be between 90° and 20°. The angle of a rib is advantageously 45° in relation to the plates of the base body. The width of the plates at the same time advantageously corresponds to the height of a hollow chamber of the aluminum extruded profile. Ultimately, any length of the plates of the connector and hence any penetration depth into the face side openings of the aluminum extruded profiles of the frame can be chosen. Sufficient stability should, however, be ensured. The connector can also be manufactured from aluminum.

The corner element can advantageously be attached to a connector. In this way, connector and corner element can be designed so that the corner element can be slid onto the connector or attached to this by means of a snap-in or snap-fit connection. Additional fixing means, like for example screws, can be provided for attaching the corner element to the connector. However, these not only increase the production costs but also add to the time and effort required to assemble the frame according to the invention.

In one preferred embodiment, a corner element comprises two sides which are in particular arranged perpendicular to one another and which are arranged parallel to the face sides of the aluminum extruded profiles and abut on these in the assembled state.

Advantageously, the aluminum extruded profiles are not mitered to 45°, so that outer walls of the aluminum extruded profiles do not adjoin one another and the frame ultimately has sharp-edged corners. In fact, the invention makes provision for the corners of the frame to be formed by the corner elements. The corner elements can be manufactured from aluminum or plastic. Plastic is appropriate if the corners have to be made of a material which is a bit softer, so that the corner elements when fitting the frame at one corner are not damaged or ultimately only the easily replaceable corner element is damaged or ruined. Preferably, the corners of the corner elements can be round or at least rounded.

In one particularly preferred embodiment, the corner elements are designed in such a way that they connect aluminum extruded profiles to one another which are cut exactly to length and are arranged at right angles to one another, so that only negligible gaps occur between the walls abutting one another.

It is advantageous if the corner elements, in particular with their visible outer walls, adjoin in alignment the outer walls of the adjacent aluminum extruded profiles, so that only negligible gaps, if any, occur between the components. It is also possible for the corner elements to overlap the adjacent outer walls of the aluminum extruded profiles, so that no gaps are visible between the components.

The corner element advantageously comprises three outer walls adjoining one another, wherein projecting parts, in particular walls, protruding inwardly emanate from two of the outer walls, with which the corner element can be attached to the connector, in particular can be slid onto at least two ribs of the connector.

An aluminum extruded profile advantageously comprises a hollow chamber which is subdivided into two areas by means of at least one inwardly protruding ledge-shaped wall, wherein the one first, in particular larger, area serves to receive a connector on the face side and the second area of the hollow chamber serves as a water drainage channel. The two areas are at the same time connected to one another over the entire length of the extruded profile. The water drainage channel, according to one embodiment of the invention, is connected to an area of a corner element, at least one wall section of which forms the discharge opening, so that water which has penetrated can drain out of the frame. The discharge opening here is advantageously arranged on the bottom side, which in most cases due to the arrangement of the frame also is the bottom side.

The aluminum extruded profiles can comprise a channel, which is open to the rear side, for gripping around the border of solar modules. The solar modules are hereby-gripped around from all sides and do not have to be additionally attached to the frame by fixing means. The corner elements can also comprise a corresponding reception space for the corner of a solar module, which is formed by a front wall together with a wall, which is parallel to it, and the side walls of the corner element.

BRIEF DESCRIPTION OF THE DRAWINGS

Different possible embodiments will now be explained in more detail below with the aid of drawings.

FIG. 2a shows a sectional perspective illustration of an aluminum extruded profile with a slit hollow space;

FIG. 4a shows a side view of the corner element according to FIG. 4;

FIG. 4b show different views of the corner element according to FIGS. 4; and 4c

DETAILED DESCRIPTION

Figure 1:
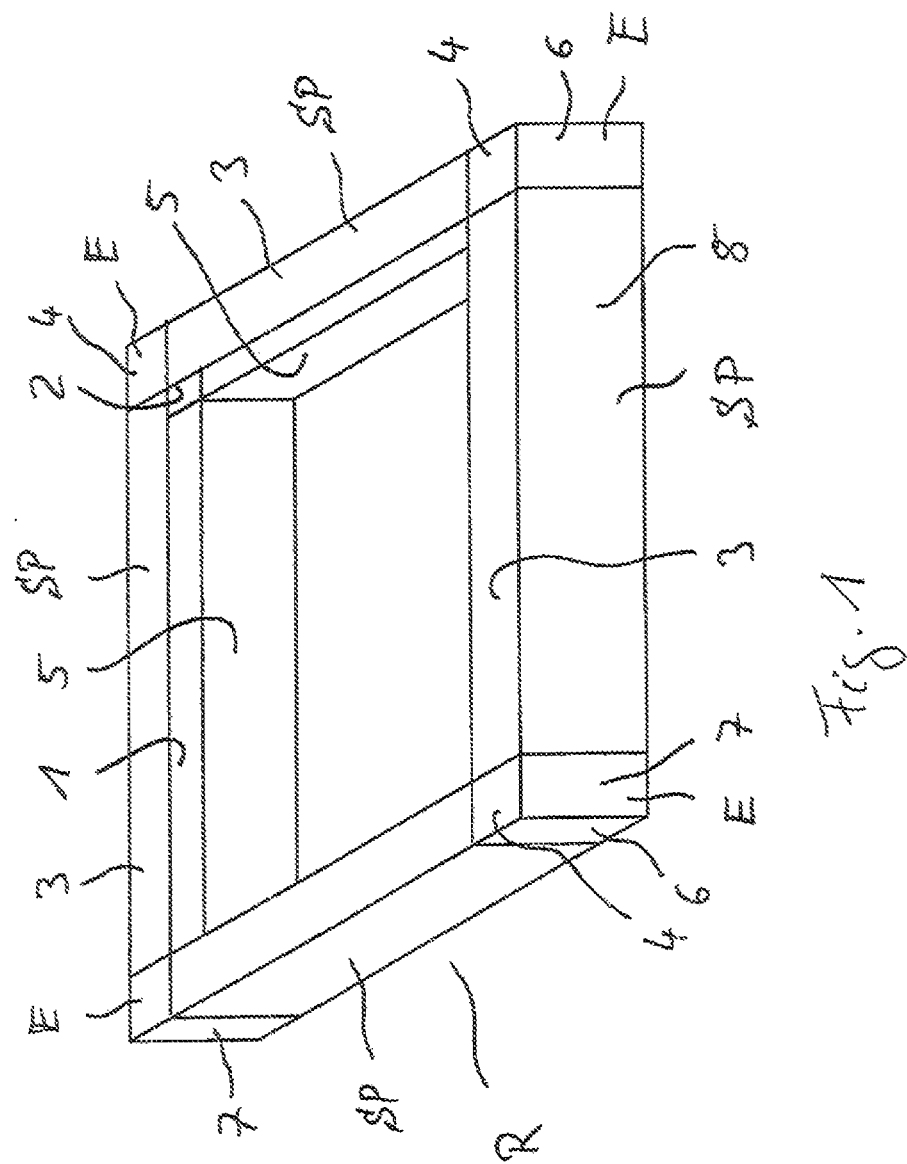
FIG. 1 shows a perspective view of a frame.

FIG. 1 shows the frame R according to the invention which is formed by the aluminum extruded profiles SP and the corner elements E. The corner elements E together with the extruded profiles SP form a reception space 1, 2 for the solar modules which are not shown in FIG. 1. The frame R comprises an upper side 3, 4 and side walls 6, 7, 8.

Figure 2:
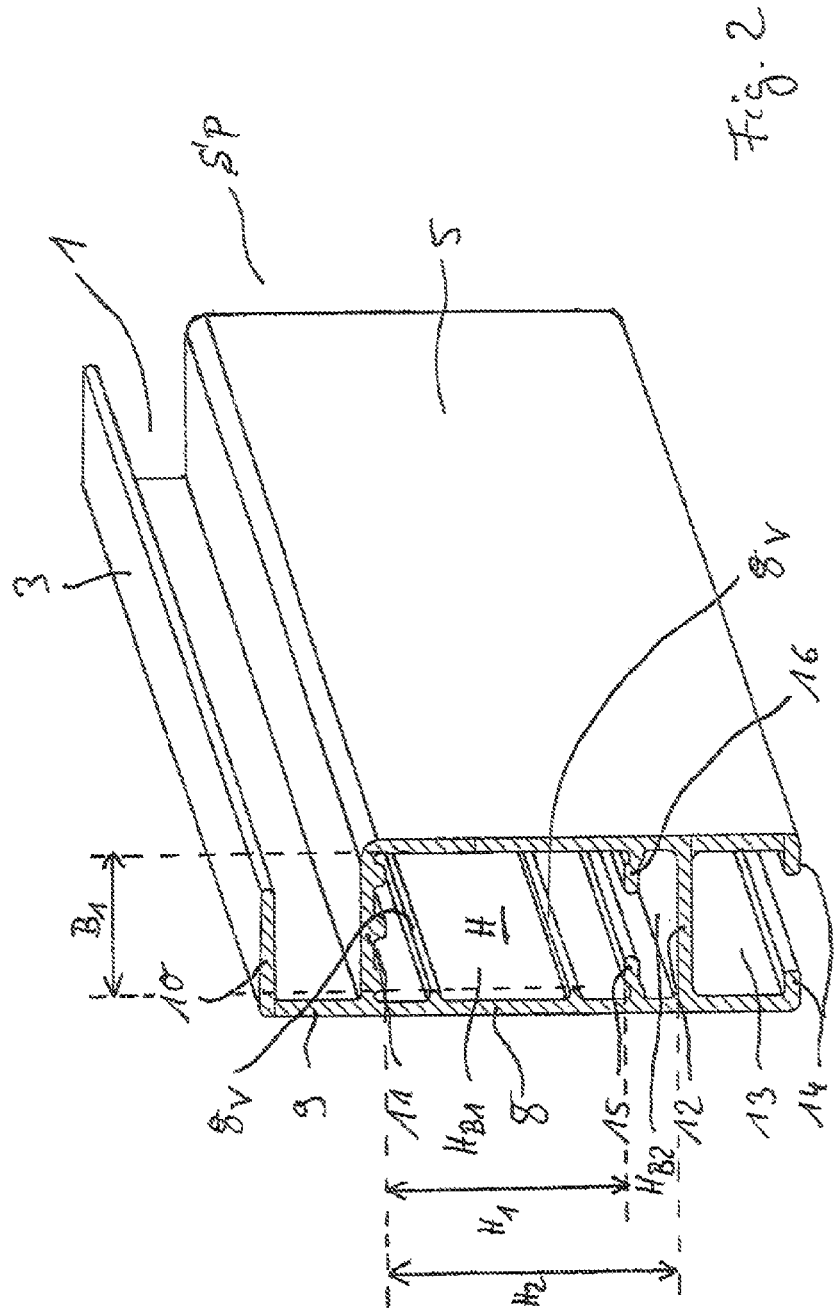
FIG. 2 shows a sectional perspective illustration of an aluminum extruded profile.
Figure 3:
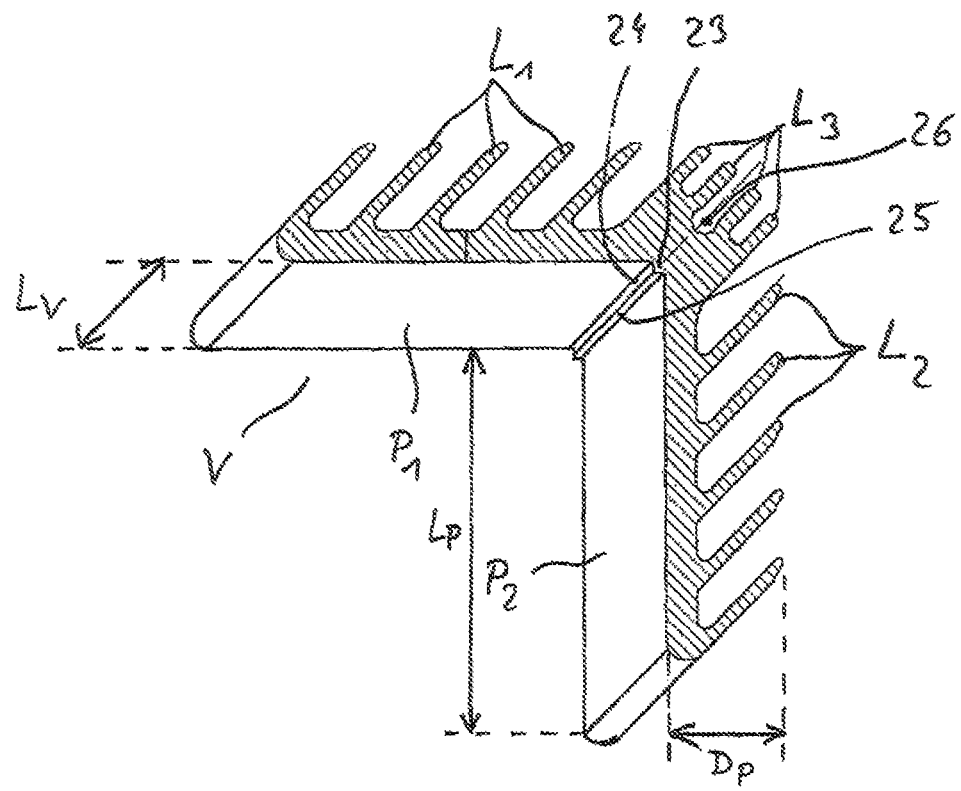
FIG. 3 shows a connector.

FIG. 2 shows a sectional perspective view of an aluminum extruded profile SP. The profile SP comprises a hollow chamber H which is subdivided into the areas $H_{B1}$ and $H_{B2}$ by means of the ledges 15, 16. The hollow chamber H is formed by the side walls 5, 8, 11 and 12. The area $H_{B1}$ serves to receive a connector V illustrated in FIG. 3 and comprises a height $H_1$ and a width $B_1$, which is adapted to the width and thickness $D_P$ of the connector V see FIG. 3). The Area $H_{B2}$ serves as a water drainage duct or channel. The C-shaped profile 13, adjoining under the water drainage duct, with the inwardly directed collar-shaped walls 14 serves for attaching the frame R. Towards the upper side 3 the profile SP comprises a groove 1, opened towards the interior 5, which is formed by the walls 19 and 11, wherein a solar module, which is not illustrated, lies with its one edge in the groove 1.

FIG. 2a shows another possible embodiment of the aluminum extruded profile SP. This hollow profile SP only differs from the one illustrated in FIG. 2 by the wall 5 of the hollow chamber H comprising a slit 5a. Hence, in terms of the invention, a chamber H is also regarded as a hollow chamber, which does not only comprise face side openings.

The connector V has a base body which is formed by the plates P1 and P2 which stand at right angles to one another and are integrally formed together, from which ribs L1, L2, L3 extend at an angle of approx. 45°. The angle can be chosen according to the requirements. The ribs L1 and L2 serve to produce a contact pressure against the inner walls of the wall 8 or its projecting parts 8v arranged on it and protruding inwards. By pressing a leg of the connector V into the hollow space HB1, the ribs L1 and L2 are slightly bent and as a result of this produce the required pressure force, so that the connector can only be pulled out of the extruded profile SP by a very strong force and possibly by destroying the extruded profile SP and/or connector V. The connector V is also an extruded profile cut to length Lv and serves to electrically connect the extruded profiles SP connected to one another via the connector V.

Figure 4:
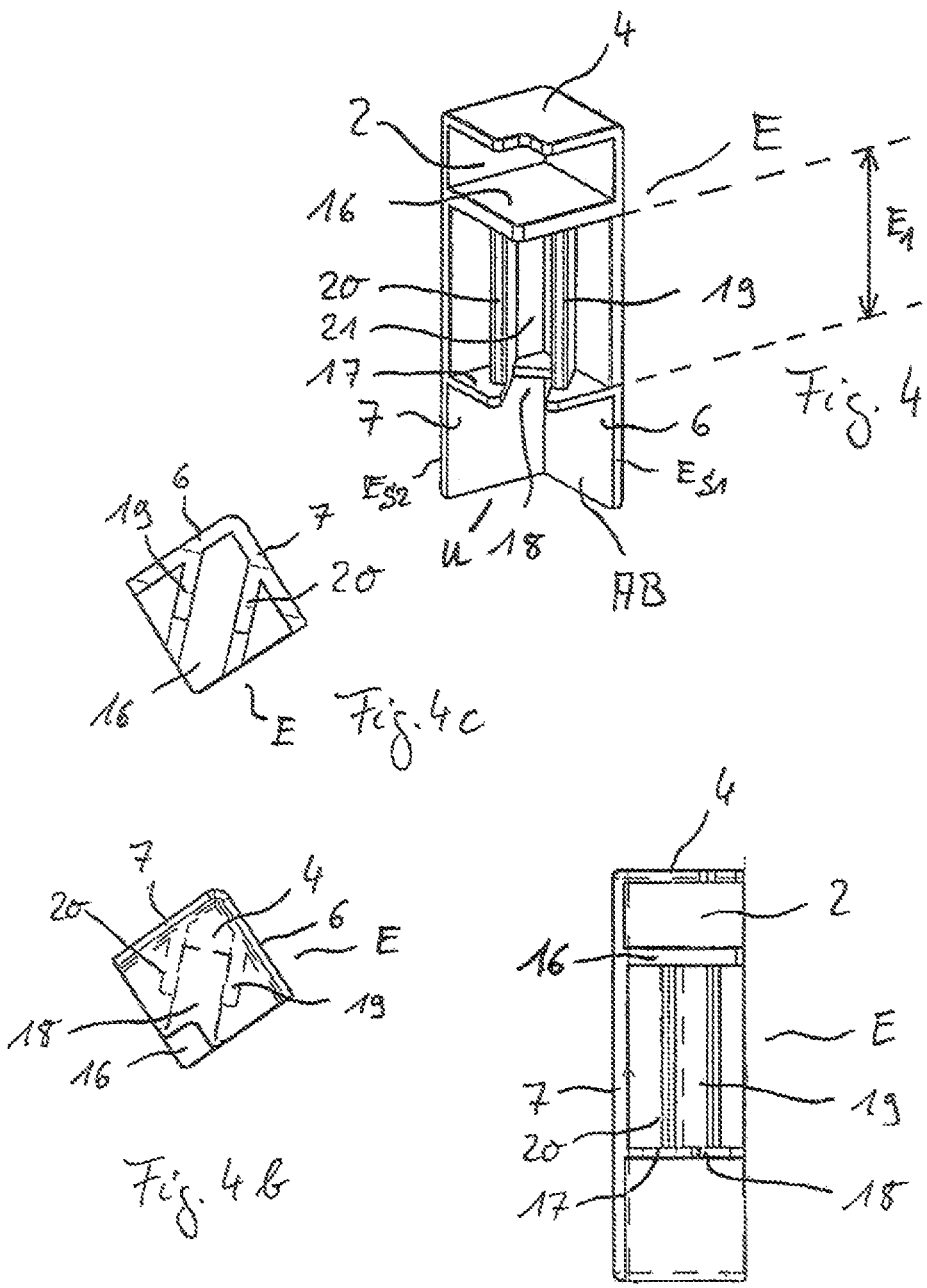
FIG. 4 shows a perspective illustration of a corner element.

The connector V comprises additional ribs L3 which serve to connect to the corner element E illustrated in FIGS. 4 to 4c. On the inner corner the connector has a projecting part 23 which forms lateral stop faces 24 and 25. When inserting the connector into the hollow chamber H of an extruded profile SP, the extruded profile SP impacts with its face side wall against the stop faces 24 and 25. The contact surfaces 24 and 25 thus ensure that the extruded profiles SP adjoining one another exactly rest against one another with their corner edges.

The connector V also advantageously comprises a recess 26 which is in particular circular, into which a screw for equipotential bonding can be screwed. This recess can also be advantageously formed during extrusion, so that no more additional time and effort required to subsequently drill an hole on the extruded profile SP or the connector V.

A corner element E according to FIG. 4 comprises three outer walls 4, 6, 7, wherein the walls 6 and 7 form the side walls and the wall 4 forms a kind of lid. The three walls 4, 6 and 7 in each case are perpendicular to one another and form the outer shell of the corner element E. The corner element E comprises two inner walls 16, 17 to provide rigidity, which are arranged parallel to the top wall 4 and at a distance E1 from one another. The top wall 4 and the wall 16 form the reception space for a corner of a solar module which is not illustrated. A discharge opening 18 in the form of a recess is formed in the lower wall 17. The wall 17 lines up precisely with the projecting parts or walls 15 of the extruded profile SP illustrated in FIG. 2. By means of the opening 18 and owing to the fact that the corner element is open towards the bottom side, it is therefore possible for water which is located in the hollow space H, in particular in the discharge duct HB2, to escape or drain away from the frame through the discharge opening 18. Walls 19 and 20, arranged at a 45° angle to the side walls 6 and 7, are formed between the walls 16 and 17. These walls 19, 20 with regard to their thickness are slightly thicker than the distance between the ribs L3, so that when sliding the corner element E on this pushes between the ribs L3 with its walls 19, 20, whereby the corner element is held securely in position by the ribs L3. The corner element is also held securely in position in the vertical direction, i.e. parallel to the surface normal of the frame, by the walls 16, 17 which abut above and below on the ribs Li.

FIG. 4a shows a side view of the corner element E. FIG. 4b shows a top view of the corner element E, wherein the walls 19 and 20 and the plate 16 are illustrated. FIG. 4c shows a sectional view of the corner element E in the area of the walls 19, 20.

Figure 5:
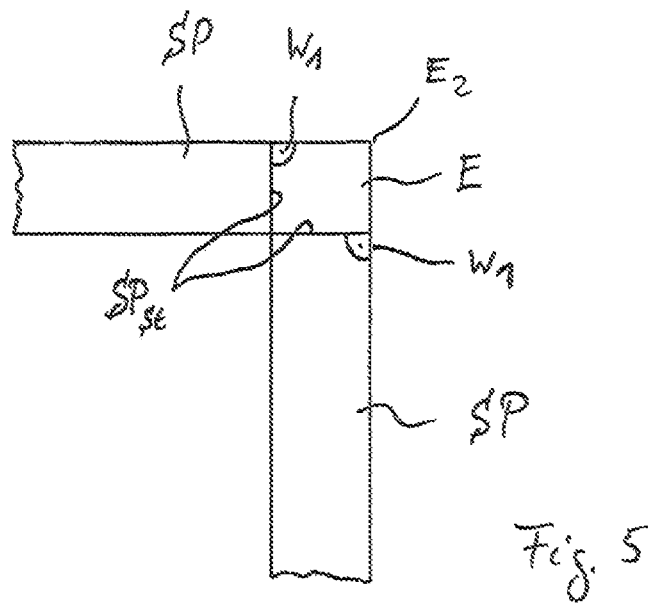
FIG. 5 shows a top view of a corner section of a frame.

FIG. 5 shows a top view of a corner E of the frame R according to the invention, as it is illustrated in detail in the previously described figures. The face sides SPSt of the extruded profiles SP are cut to length at right angles (angle W1) and abut on the corner element E with as few gaps as possible. The outermost corner edge E2 is therefore formed by the corner element E.

Figure 6:
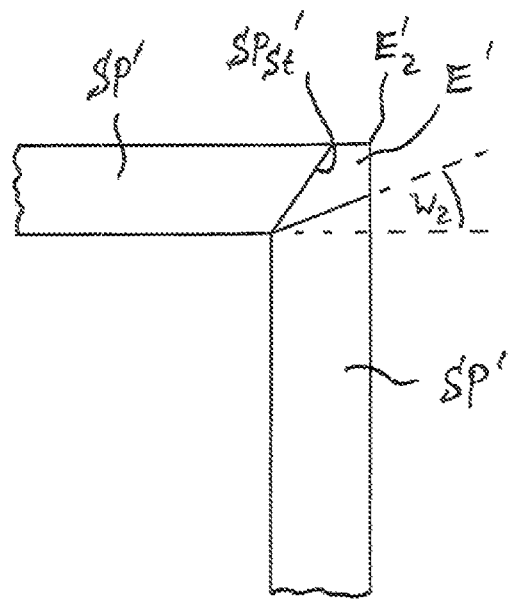
FIG. 6 shows a top view of a corner section of an alternative frame.

FIG. 6 shows an alternative configuration of the frame, wherein the extruded profiles SP' are not at right angles but deflected at an angle W2. The corner element E' is correspondingly shaped, so that it fills out the area between the face sides SPSt' of the two extruded profiles, SP' adjoining one another and also forms a corner E2' of the frame. In this embodiment also a connector can be used according to FIG. 3 without modifications. This embodiment is only supposed to show that the corner element E' does not have to be designed as a rectangular element. However, the corner element E, according to FIGS. 1 to 5, shows the preferred configuration of a corner element E, since with this shape the extruded profiles SP can be cut to length easily and simply by adhering to the right angle.

The invention claimed is:

1. A frame for a solar module comprising:
 a plurality of aluminum extruded profiles;
  at least one of said aluminum extruded profiles having at least one hollow chamber;
   said hollow chamber comprising a first area and a second area subdivided by at least one inwardly protruding ledge-shaped wall;
    said first area being larger than said second area and adapted to receive a connector;
    said second area being adapted to serve as a water drainage channel; and
 at least one corner element comprising a discharge opening physically connected to the hollow chamber of at least one of an adjacent aluminum extruded profile;
  wherein said corner element comprises three outer walls;
   wherein two of the walls form side walls and the third wall forms a lid; and
   the three walls are perpendicular to one another and form an outer shell of the corner element.

2. The frame according to claim 1, further comprising a connector adapted to connect the aluminum extruded profiles to form sides of said frame.

3. The frame according to claim 2, wherein the connectors are adapted to be pressed in a force-fit manner into the open face sides of the aluminum extruded profiles.

4. The frame according to claim 2, wherein the connectors comprise at least one rib.

5. The frame according to claim 4, wherein an end of the rib of the connector presses against an inner wall of the aluminum extruded profiles if the connector is inserted into an open end of the aluminum extruded profile.

6. The frame according to claim 2, wherein connectors comprise extruded profiles cut to length.

7. The frame according to claim 2, wherein the corner element is adapted to be attached to a connector.

8. The frame according to claim 2, wherein the connector comprises a recess for screwing in a screw for equipotential bonding.

9. The frame of claim 8, wherein the recess for screwing in a screw is formed during the extruding process.

10. The frame according to claim 8, wherein the recess extends in the longitudinal extent of the connector, which is cut to length and formed as an extruded profile, in such a way that the screw axis of the screw for equipotential bonding runs parallel to the surface normal of the frame.

11. The frame of claim 2, wherein the connectors are electrically conductive.

12. The frame according to claim 1, wherein outer walls of the corner element adjoins in alignment with outer walls of the adjacent aluminum extruded profiles.

13. The frame according to claim 1, wherein the water drainage channel is in communication with an area of the corner element wherein at least one wall section of the corner element forms the discharge opening.

14. The frame according to claim 1, wherein the aluminum extruded profiles comprise a channel open to the interior of the frame for interfacing with a border of solar modules.

15. The frame according to claim 1, wherein the corner element is manufactured from aluminum or plastic.

16. The frame of claim 1, wherein the first area and second area of the extruded profile are connected to one another over the entire length of the aluminum extruded profile.

* * * * *